Sept. 8, 1936.  J. YOUNG  2,053,808
JOINT CONSTRUCTION AND METHOD OF PRODUCING SAME
Filed Oct. 11, 1934   2 Sheets-Sheet 1
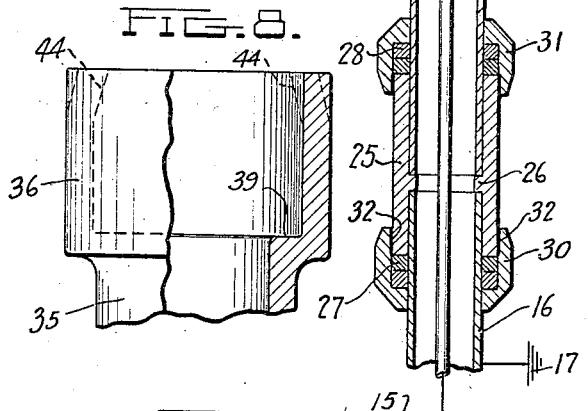
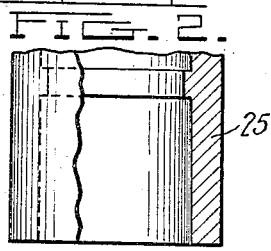
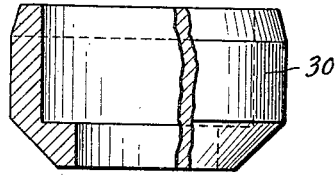
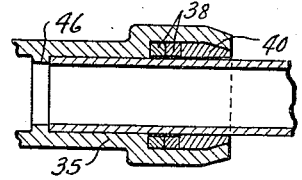
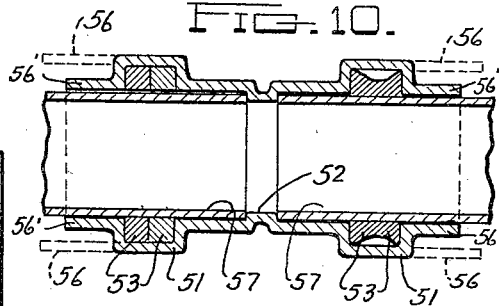
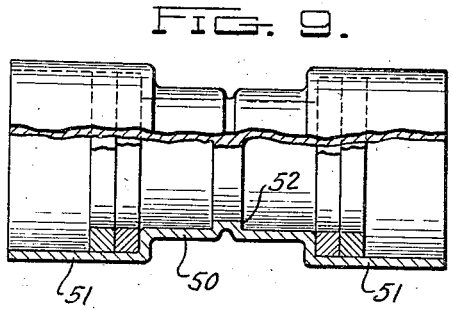
INVENTOR
John Young
BY
Braselton, Whitcomb Davies
ATTORNEY Sept. 8, 1936. J. YOUNG 2,053,808
JOINT CONSTRUCTION AND METHOD OF PRODUCING SAME
Filed Oct. 11, 1934 2 Sheets-Sheet 2
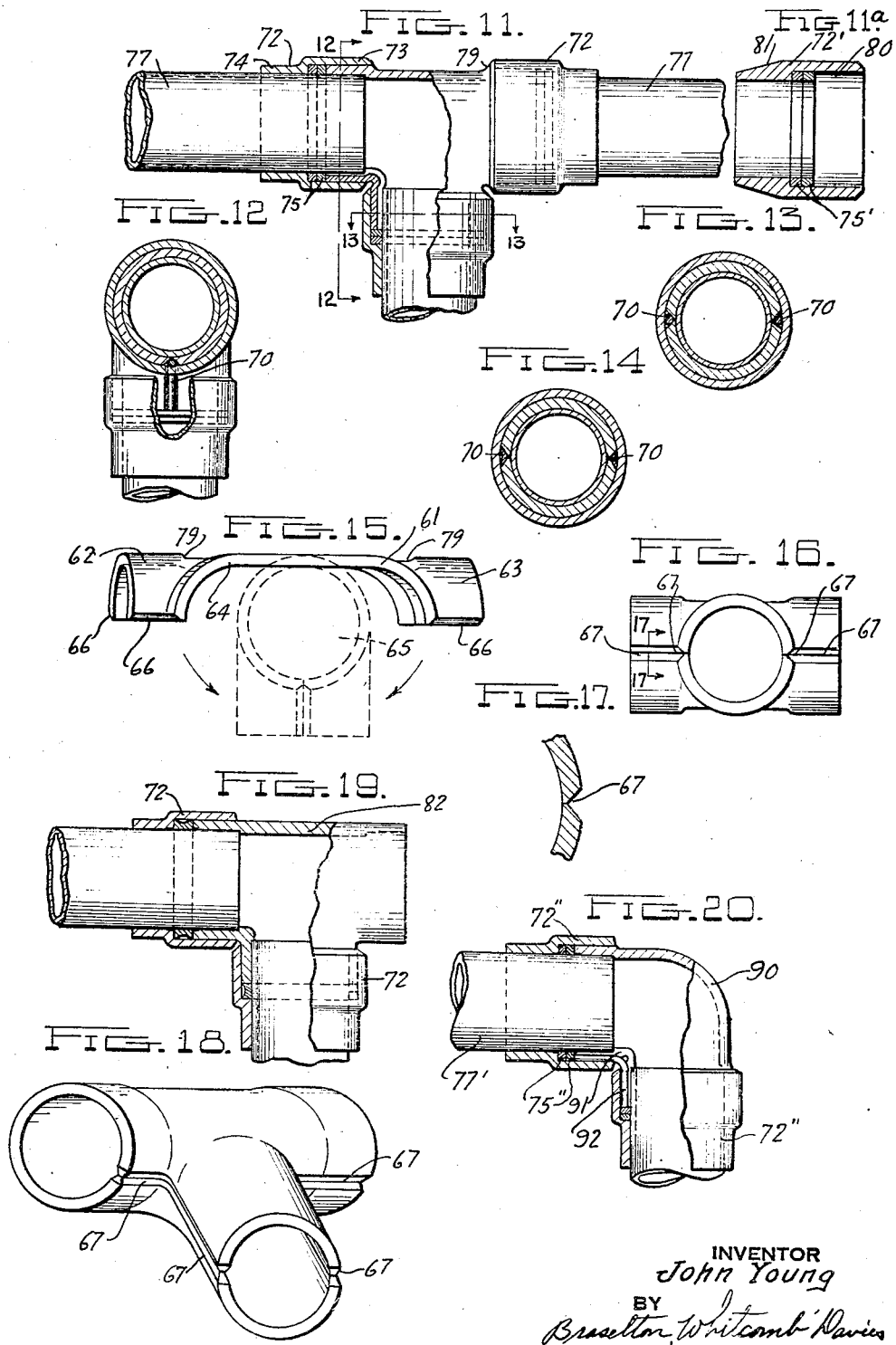
INVENTOR
John Young
BY
Braselton, Whitcomb Davies
ATTORNEY Patented Sept. 8, 1936

2,053,808

UNITED STATES PATENT OFFICE 2,053,808

JOINT CONSTRUCTION AND METHOD OF PRODUCING SAME

John Young, Toledo, Ohio

Application October 11, 1934, Serial No. 747,829

19 Claims. (Cl. 29—148.2)

This invention relates to conduits and couplings or fittings therefor, and relates particularly to the type usable for joining electrical conduits, pipes, thin walled tubing, or the like.

The invention contemplates the provision of coupling devices for conduits in which the coupling means are fused to provide connections which are impervious to moisture and at the same time providing an effective electrical ground circuit.

The invention embraces a method or process of producing a fitting from sheet material and in which a fusible alloy is utilized to effect a sealing of the same in the formed fitting.

The invention embraces the provision of fusible fittings of a character wherein the fusible alloy is preassembled into the fitting or coupling.

An object of the invention is the provision of a coupling means of this character which is especially adapted for use in joining thin walled tubing, as for example, that fabricated of copper, brass, steel, or the like.

A further object of the invention resides in the provision of coupling means which, when applied to a fitting, are complete including the fusible alloy, and the connection may be effected without the use of extraneous sealing materials and without special operation upon pipes or tubes engageable with the fitting.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred in which:

Figure I is a sectional view of a joint embodying one form of my invention as used with a conduit forming part of a typical electrical circuit in which the conduit forms a return or ground circuit;

Figure II is an enlarged view of a portion of a fitting of my invention before the fusible alloy has been assembled thereto;

Figure III is a sectional view of a plurality of rings of fusible alloy forming an element of my invention;

Figure IV is a view of a bushing forming a part of my invention;

Figure V is a view showing a modified form of joint structure of my invention;

Figure VI is an enlarged view showing one of the elements of joint structure illustrated in Figure V;

Figure VII is an enlarged view showing rings of solder or fusible alloy as utilized in the structure of my invention.

Figure VIII is an enlarged fragmentary view of one end of a fitting of my invention showing its configuration prior to the assembly of the other elements therein.

Figure IX illustrates a further form of a joint fitting of my invention.

Figure X illustrates the joint of Figure IX in forming a coupling or connection between conduits or pipes.

Figure XI is a view showing a T-shaped joint in which the T fitting is formed of sheet material;

Figure XIa is a sectional view through a modified form of sleeve forming an element of my invention;

Figure XII is a vertical sectional view taken substantially on the line 12—12 of Figure XI;

Figure XIII is a sectional view taken substantially on the line 13—13 of Figure XI;

Figure XIV is a view similar to Figure XIII showing the position taken by the fusible metal after the application of heat;

Figure XV is a view showing the method of forming the T-shaped fitting of my invention;

Figure XVI is a view showing further development of the method illustrated in Figure XV showing the T-fitting completely formed;

Figure XVII is an enlarged fragmentary sectional view taken on the line 17—17 of Figure XVI;

Figure XVIII is an isometric view of the formed T-shaped fitting illustrated in Figure XVI;

Figure XIX is an elevational view partly in section showing connection of the T fitting with a tube after the fusible metal has been heated to form the completed joint.

Figure XX is a view showing an L fitting formed of sheet material and showing the arrangement of the sealed joint of my invention incorporated therewith.

While I have illustrated the invention as used especially for application to electrical wiring conduits, I contemplate the utilization of the same to connect any type of pipes or tubular elements wherever the same may be found to be applicable.

In the particular application of my device as illustrated in Figure I, the electrical circuit diagrammatically consists of a current supply line 10, transformer 12, the secondary 13 of which is grounded as at 14, the other current supply wire 15 leading from the secondary 13 being contained within a conduit 16, the sections of which are joined together through the means of my invention. The conduit is grounded as at 17 and the supply wire 14, as well as the walls of the conduit through suitable connections as illustrated at 18, form the current conveying means to energy translating devices 20. I am enabled to utilize the walls of the wire conduits in the manner illustrated for the reason, as hereinafter explained, that the joints of my invention make perfect electrical connections and are impervious to moisture.

As particularly illustrated in Figures I through IV, inclusive, the form of fitting or coupling shown comprises a sleeve member 25 which is internally centrally formed with an annular flange 26, this flange serving to position the pipes or conduits 16 and 16', which are to be joined together. Arranged at each end of the sleeve 25 is a plurality of rings 27 and 28 of fusible alloy or solder which rings are preferably blanked from flat sheets of fusible metal and are coated or associated with suitable fluxing compound. The bushings 30 and 31 surround the rings of fusible metal and snugly fit over the extremities of the sleeve member 25, the assembly above described being particularly shown in Figure I. In order to complete the joint, heat is applied to each end portion of the sleeve through the bushings 30 and 31 either electrically or by the application of flame to a degree such as to melt or fuse the rings 27 and 28 and the molten metal flows into the interstices between the inner walls of the sleeve 25 and the exterior surfaces of the conduit or tube extending into the sleeve and are fixedly joined at the time of solidification of the molten metal. At the same time, a portion of the fusible metal flows between the interior walls of the bushings 30 and 31 and the exterior end portions of the sleeve 25 as illustrated at 32, thus joining the bushings 30 and 31 to the sleeve 25. From the foregoing description, it will be noted that a joint or connection is thus formed through the medium of the fused metal, which is absolutely impervious to moisture and which makes a good electrical connection. While it is to be noted that the metal flows lengthwise of the conduits 16 and 16', the metal does not flow inwardly as far as the annular flange 26 as the heat is only applied locally to the surface of the bushings 30 and 31. As the heated metal flows away from the bushings it becomes chilled upon contact with relatively cool portions of sleeve 25 and the tubes so that none of the fusible metal will flow past the end of the tube, and there is therefore no decrease in the cross-sectional internal area of the conduit.

Figures V through VIII, inclusive, illustrate another form of fitting or coupling wherein numeral 35 is a sleeve similar to sleeve 25 hereinbefore described, having its ends of enlarged diameter as illustrated at 36, the interior bore of which is of dimension to slidably receive one or more rings of fusible metal 38 which rest against an internal shoulder 39 formed in each end of the sleeve 35. After the rings 38 are inserted in the enlarged portion 36, bushing 40 is inserted and rests upon the outermost ring of fusible metal to hold the ring or rings in proper position within the sleeve. The exterior end portions of the walls of bushings 40 are tapered as illustrated at 42 in Figure VI, and are preferably knurled as at 43. After the assembly is made of the parts as above described, the extremities of the enlarged portions 36 are swaged or forced inwardly as indicated by the dotted lines at 44 in Figure VIII until the interior portions of the swaged walls contact with the tapered exterior walls 42 of bushing 40, thus retaining the assembly of fusible rings and bushings in place in the coupling or fitting 35. The forcing in of the extremities of sleeve 35 may be performed in a suitable die or may be spun or otherwise bent into bushing retaining position. Fittings of this character may be thus assembled and sold as a unitary structure, and when it is desired to couple or connect conduits or pipes together, it is only necessary to insert the conduits or pipes into a fitting 35 until the ends of the conduits engage the internal annular flange 46 to properly position the conduits, after which heat is applied to the exterior portions 36 of the fitting to fuse the metal and make a tight joint as illustrated in Figure V. The knurling 43 permits minute interstices through which molten metal may flow to add further area of fused metal in the joint.

Figures IX and X illustrate a further form of fitting wherein a tubular member or sleeve may be formed as by rolling or spinning or otherwise to form reduced central portion 50, enlarged end portions 51, and a central internal flange 52 of reduced diameter, the latter forming a conduit or tube positioning means. After the sleeve is formed to the configuration illustrated in Figure IX, one or more rings of fusible alloy 53 may be inserted into contact with the internal annular shoulders 54 formed in fitting. The extremities of fittings 50 may then be swaged, spun, or otherwise forced inwardly from the dotted positions 56 shown in Figure X to the positions 56', thus retaining the rings of fusible metal 53 within the fitting. In the operation of completing a joint structure, the tubes or conduits 57 may be inserted in each end of the fitting to contact with the annular flange 52 to properly position the tubes, after which heat may be applied to the enlarged portions 51 as illustrated in Figure X to fuse the metal rings causing the molten metal to flow and perfect the joint. The left-hand portion of the fitting shown in Figure X illustrates the assembly before fusing, and the right-hand portion of Figure X illustrates the completed joint after the solder rings have been fused.

It is to be noted that joint fittings of the character described herein may be readily and easily made from tubular material and easily machined to the proper sizes and readily assembled into completed structures without the use of special tools, thus providing an effective and yet simple fusible joint construction.

Figures XI through XVIII, inclusive, disclose a T-shaped fitting formed by a process of my invention. A T-fitting of the character embodying my invention may be readily fabricated from sheet material as for example, sheet copper, brass, steel or the like in which a blank of sheet material is first formed to the configuration illustrated as 61 in full lines in Figure XV wherein the side outlet of the fitting is formed in two semi-annular curved portions 62 and 63 and a central portion 64, which when the blank is folded to the configuration shown in dotted lines in Figure XV forms the aligned outlets 65 of the T fitting. In this formation of fitting from sheet material, the edge portions as at 66 of the blank are preferably tapered so that when the blank is folded to finished configuration, a plurality of depressions 67 are formed as shown in Figures XVI, XVII and XVIII. These grooves or depressions 67 are adapted to receive a bar of fusible material 70, which material may be of any cross section so as to fit into the grooved portions.

A plurality of bushings or sleeves 72, as illustrated in Figure XI are provided having enlarged portions 73 which telescope over the exterior curved walls of the outlets of the T fitting which are also formed with portions 74 of reduced diameter projecting beyond the outlets of the fitting. As has been previously described in connection with other forms of the invention, the bushings 72 are arranged to receive one or more rings of solder or fusible material 75 which lie between an internal shoulder in the sleeve 72 and the extremity of each outlet of the fitting as particularly shown in cross section in Figure XI. The lesser internal diameter of the portion 74 of sleeve 72 and the internal diameter of a portion of each outlet of the T fitting are of dimension sufficient to slidably receive tubular members or conduits 77, the ends of the conduits projecting into the fitting engaging with stop shoulders 78 formed in the interior portion of the T fitting. These shoulder portions may be initially formed in the blank as illustrated by the depressed portions 79 in Figures XI and XV or they may be formed by boring or reaming the extremities of the fitting to a slightly larger diameter to form the shoulder portions 78.

The assembly of a joint construction of this character is as follows: The fitting may be marketed in the form shown in dotted lines in Figure XV with the bushings 72 in place as illustrated in Figures XI and XII, bars of solder or fusible alloy disposed in the grooves 67 with the rings 75 of fusible alloy disposed adjacent the outlets of the fitting and carried by the bushings 72. The fitting as thus assembled is ready to receive the conduits 77. In order to complete the joint structure, heat is applied to the exterior portions 73 of the sleeves 72, which causes the bars of solder or fusible alloy 70 to fuse, as illustrated in Figure XIV, thus making a hermetically sealed fitting adjacent to grooves 67 and the rings of fusible alloy 75 will simultaneously fuse to unite the tubular elements 77 and sleeves 72 to the outlet portions of the fitting to make a hermetically sealed joint. As illustrated in Figure XI, the sleeves 72 may be formed of sheet material, but it is to be understood that any suitable form of sleeve may be utilized as for example, the type shown in Figure XIa, which may be readily and quickly machined from tubular material. This sleeve 72' may be bored out as at 80 to receive the rings of solder 75', and the outermost extremities of the sleeve may be tapered as 81 to effect a saving in metal and produce a joint having a pleasing appearance. This form of sleeve or bushing is preferred when the same is made of bronze, brass, or the like, and this type of bushing may be utilized in the same manner as the sheet metal bushing 72, hereinbefore described.

In the form of the invention shown in Figure XIX, the body of the T fitting 82 is illustrated as formed of cast material, and the bushings 72 are applied in the same manner as in Figure XI, Figure XIX illustrating in cross section the approximate position or configuration taken by the fusible metal after the application of heat and subsequent congealing of the fusible metal to form a complete joint.

Figure XX illustrates an L fitting of the character embodying my invention in which the body of the L 90 may be formed of sheet material in a similar manner as the T fitting is formed as hereinbefore described with the seam of the sheet material at 91 also formed with grooved portions similar to the grooves 67 to receive a bar of fusible alloy 92 enclosed within the bushings or sleeves 72" which are similar in construction to the sleeves 72, as illustrated in Figure XI. The rings of solder 75" are carried by the bushings 72', and when heat is applied to the exterior surface of the bushings 72', the rings 75' and the bar 92 are fused to make a hermetically sealed joint, joining the conduits 77' to the sleeves 72' and also to the body of the fitting 90.

It is apparent that, within the scope of the invention modifications and different arrangements may be made other than is herein disclosed, and the present disclosure is illustrative merely, the invention comprehending all variations thereof.

What I claim is:

1. A fitting comprising in combination a sleeve; a ring of fusible metal contacting a wall of said sleeve; and a bushing assembled within said sleeve for holding said ring of fusible metal in position, said sleeve being formed to retain said bushing and ring in assembled relationship.

2. A fitting comprising in combination a sleeve; a plurality of rings of fusible metal contacting each other; one of said rings contacting the end wall of said sleeve; and a bushing assembled within each end of said sleeve for holding said rings of fusible metal in position.

3. In combination, a conduit for electric wiring comprising a plurality of tubular members; a sleeve for receiving the extremities of said tubular members; means on said sleeve for separating the extremities of said members; rings of fusible metal contacting with said sleeve and said members, bushings engageable with said sleeve for holding said fusible rings in position; the parts being arranged whereby heat applied to said bushings causes said fusible metal to perfect a fused joint between said tubular members and said sleeve whereby said tubular members may be utilized as a portion of said electrical circuit.

4. In combination, a conduit for electric wiring comprising a plurality of conduits; a sleeve for receiving the extremities of said tubular members; rings of fusible metal contacting with said sleeve and said conduits; bushings engageable with said rings of fusible metal for holding said fusible rings in position; the sleeve and conduits being separated by a space to accommodate flowing of the fusible metal when heated; the parts being arranged whereby heat applied to said bushings causes said fusible metal to flow into said space and when cooled to perfect a fused joint between said conduits and said sleeve whereby said conduits and joint may be utilized as a portion of said electrical circuit.

5. A fitting comprising a thin walled sleeve having end portions of increased diameter; rings of fusible metal assembled in said end portions; a bushing in each of said end portions for holding said rings in fixed position, portions of said sleeve being formed to contact portions of said bushings to hold the latter in assembled relationship in said sleeve.

6. A fitting comprising a thin walled sleeve having enlarged end portions; rings of fusible metal assembled in said enlarged end portions; a bushing in each of said end portions for holding said rings in fixed position, said bushings having knurled wall portions; said sleeve being formed to contact the knurled portions of said bushings to hold the latter in assembled relationship in said sleeve.

7. Steps in the method of producing a fusible joint fitting comprising forming a sleeve to configuration having a reduced central portion and enlarged end portions; of inserting a ring fusible alloy in each of said enlarged end portions; and of subsequently inserting a bushing in said enlarged end portions and forming walls of said sleeve into engagement in said bushing to hold said rings of fusible alloy in position for fusing.

8. Steps in the method of producing a fusible alloy fitting comprising forming a sleeve of thin walled material with a reduced central portion and an internal central flange of further reduced diameter; of inserting rings of fusible material in said sleeve and forcing end portions of said sleeve inwardly to hold said fusible rings in position in the sleeve.

9. Steps in the method of producing a fusible alloy fitting comprising forming a sleeve of thin walled material with a reduced central portion and a central flange of further reduced diameter; of inserting rings of fusible material in said sleeve and forcing end portions of said sleeve inwardly to hold said fusible rings in position in the sleeve; of inserting tubes in said sleeve; and of applying heat to the sleeve adjacent the fusible rings to cause the latter to fuse and form an integral joint.

10. A fitting comprising in combination a sleeve; a ring of fusible metal positioned within and contacting a wall of said sleeve; a fluxing compound associated with said fusible metal; and a bushing assembled with said sleeve for holding said ring of fusible metal in position, said sleeve being formed to retain said bushing and ring in assembled relationship.

11. Steps in the method of producing a fitting comprising severing and forming a sheet of material to T-shaped configuration providing a plurality of tubular outlets; of affixing a bar of fusible alloy adjacent the seam of the formed sheet of material; and applying bushings exteriorally of the outlets of said fitting for securing the bar of fusible alloy in position.

12. Steps in the method of producing a fitting from sheet material which comprises forming and severing a blank with tapered edge portions; of forming the blank to form a T-shaped tubular fitting wherein the tapered edge portions produce depressions in the exterior side walls adjacent the seam; of inserting a bar of fusible alloy in the depressions; of telescoping bushings over portions of the outlets to hold the bar of fusible alloy in position; and of applying heat to fuse the alloy and form a sealed seam in the fitting.

13. Steps in the method of producing a fitting of sheet material, which comprises severing a blank to predetermined configuration; of folding the blank to form a plurality of intersecting tubular portions; of means for applying a bar of fusible alloy to the seam of the fitting; and of applying means telescoping with the tubular portions to retain the fusible alloy in position.

14. A T fitting having a body portion formed of sheet material; a bar of fusible alloy positioned adjacent the seam; bushings telescoped over the outlet portions of the fitting; rings of fusible alloy interposed between the bushing and the extremities of the body portion of the fitting, said bushing being adapted to retain the bar of fusible alloy in the seam of said fitting.

15. Steps in the method of producing a fusible alloy fitting which comprises forming a cylindrical sleeve with an internal flange of reduced diameter; of inserting a ring of fusible alloy within the sleeve; and of distorting a portion of said sleeve to hold said fusible ring in position in the sleeve.

16. A fitting comprising a cylindrical sleeve having a central internal annular abutment; a bushing having an annular surface snugly fitting a cylindrical surface of said sleeve; a ring of fusible alloy positioned within said bushing and contacting an end wall of said sleeve, said abutment being arranged to position said fitting with respect to a conduit with which it may be connected, the friction between said sleeve and bushing serving to retain the parts in fixed relation.

17. A fitting comprising a cylindrical sleeve having a central internal annular abutment; a bushing having a cylindrical surface telescoped with said sleeve; a ring of fusible alloy positioned within said bushing having a wall portion contacting a portion of said ring of fusible alloy, said fusible alloy contacting an end wall of said sleeve, the sleeve end wall and the portion of said bushing contacting the fusible alloy being arranged in parallel planes.

18. A fitting comprising a substantially cylindrical sleeve having an internal annular shoulder portion spaced from the ends of said fitting; a member telescoped with said sleeve, portions of said sleeve and member being separated to form therebetween an annular chamber of rectangular cross section; and a ring of fusible alloy positioned in said chamber.

19. A fitting comprising a substantially cylindrical sleeve having an internal annular shoulder portion spaced from the ends of said fitting; a member telescoped with said sleeve; portions of said sleeve and member being separated to form therebetween an annular chamber; and a ring of fusible alloy filling said chamber.

JOHN YOUNG.